Figure 1:
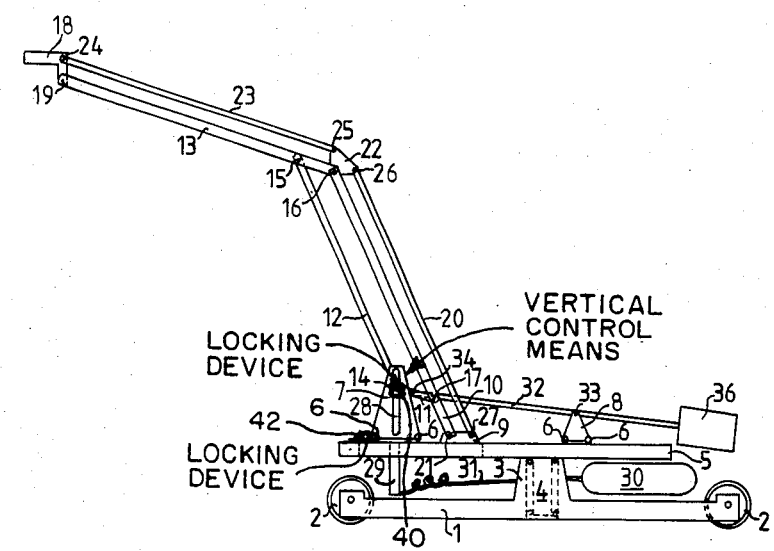

United States Patent [19]

Lindsay

[11] Patent Number: 4,657,220

[45] Date of Patent: Apr. 14, 1987

[54] TELEVISION CAMERA MOUNTING EQUIPMENT

[75] Inventor: Richard A. Lindsay, Suffolk, England

[73] Assignee: W. Vinten Ltd., England

[21] Appl. No.: 768,711

[22] Filed: Aug. 23, 1985

[30] Foreign Application Priority Data

Sep. 1, 1984 [GB] United Kingdom ................. 8422154

[51] Int. Cl.⁴ ............................................. F16M 3/00
[52] U.S. Cl. .................................. 248/647; 248/648; 352/243; 354/293
[58] Field of Search ...................... 248/647, 648, 123.1, 248/162.1, 292.1, 297.1; 354/293, 81; 352/243

[56] References Cited

U.S. PATENT DOCUMENTS 2,447,667  8/1948  Raby ................................. 352/243 X
2,913,226 11/1959  Pritchard et al. ..................... 248/647
3,613,546 10/1971  Richardson ..................... 352/243 X
3,917,200 11/1975  Johnson ............................... 248/647

Primary Examiner—Ramon O. Ramirez
Attorney, Agent, or Firm—Larson and Taylor

[57] ABSTRACT

Camera mounting equipment comprising a wheeled base with a rotatable table mounted thereon. The rotatable table having a balanced pantographic arm pivoted thereon and means for controlling vertical and horizontal movement of a camera mounting platform attached to the other end of the arm. The equipment may be locked or unlocked in any combination of the three axes so that the camera mounting platform may have complete freedom of movement within its operational limits or may be limited to certain straight line or planar movement. The equipment is also counterbalanced and the arm may be remotely controlled using low power motors.

8 Claims, 3 Drawing Figures

U.S. Patent     Apr. 14, 1987     4,657,220

TELEVISION CAMERA MOUNTING EQUIPMENT

This invention relates to television camera mounting equipment, or the like, and more particularly, though not exclusively, to television camera mounting equipment for studio use.

Television camera mounting equipment such as balanced pedestals at present in use in television studios cover most of the desirable features, such as smooth transition of a camera in the vertical direction and, as the pedestals are normally wheel mounted and operating on a smooth floor, they also cover smooth transition in the horizontal plane. Some of these pedestals will also rotate in azimuth and any one of the three movements may be used independently of the others. However, assuming, for example, an upward or downward sloping transition were required, and this is sometimes the case, it is a very hit or miss affair as the operator has to imagine the changing vertical and horizontal co-ordinates which produce the line of travel, and endeavour to alter the pedestal height, which requires a minimal force to overcome inertia, at the same time as the pedestal is being moved in a straight line across the floor where, due to the weight difference alone, a comparatively high force is required to overcome inertia. The resulting wavelike transition which should preferably be a straight line is, more often than not, far from acceptable.

This problem is caused by the appreciable difference in the vertical and horizontal forces required and could be considerably reduced were the forces equally balanced and only a small guiding force required.

The same type of problem exists when using pedestals in some other operations, e.g. where a camera needs to be moved in a particular plane. The horizontal plane can be overcome by moving the balanced pedestal over the floor on its wheels, but the vertical plane suffers the same problems as for the angled transition. It is always the problem of applying the changing vertical and horizontal co-ordinates manually, and hoping for a smooth transition.

Balanced arms, also used in the art, do not follow a true vertical as does the pedestal. In many applications an arm is more appropriate for the task than a pedestal, due to its greater versatility but in the past the lack of true vertical guidance has caused a problem.

It is also desirable that full counterbalance of the mass, comprising camera and arm, is maintained at all times in elevation and horizontal movement or any combinations thereof so that only a minimal force is required to traverse in any direction within the working envelope of the arm and yet full stability and rigidity is maintained at all times both during positional change and at the changed position.

It is a further desirable feature that motion may be constrained to limited planes or directions, in addition to the aforementioned vertical guidance, as and when required so that an operator need not concentrate on guidance and only needs to supply the small force necessary for movement.

A still further desirable feature is that the balanced arm may be easily operable from a remote site by such as small electric motors, or the like, controlling the arm movement from remotely controlled signal lines.

It is therefore an object of this invention to provide a fully balanced arm wherein the desirable features of the pedestal are retained and the additional desirable features are incorporated thereby substantially overcoming the problem.

According to the invention we provide a balanced arm for television or the like comprising, a movable base, a rotatable platform mounted on said base, a first traversable mounting on said rotatable platform having vertical control means operable on a control pivot of a pantograph having its fulcrum arm pivotally located on said rotatable table, a load carrying platform pivotally located at the end of the pantograph proportional arm, linkages forming a first parallelogram on said proportion arm wherein one link is formed on said load carrying platform and a second parallelogram on said fulcrum arm wherein one link is formed from part of said rotatable platform and said two parallelograms share a common link; arm mass counterbalancing means pivotally mounted on a second traversable mounting on said rotatable platform and having its fulcrum pivotally attached to a short link of said pantograph, load counterbalancing means operable on said vertical control means, and guide means for said first and second traversable mountings wherein said load carrying platform and load retains verticality and may be traversed with full counterbalance in any plane within its operational limits.

Figures 2, 3:
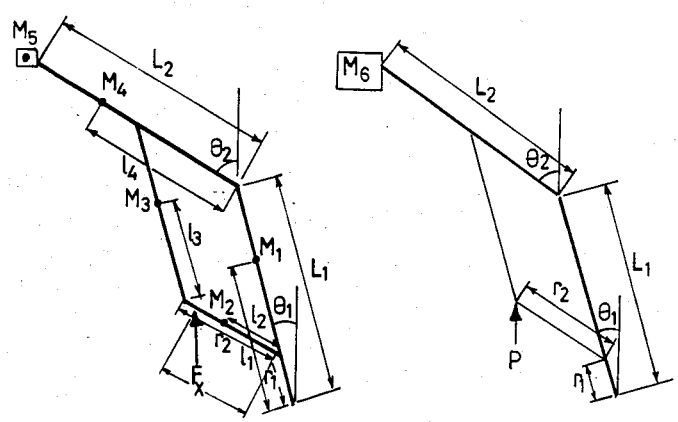

The invention will now be described, by way of example only, in conjunction with the accompanying schematic diagrams in which, FIG. 1 shows a schematic system according to the invention FIG. 2 shows the mathematical diagram for proving mass balance of structure and FIG. 3 shows the mathematic diagram for proving balance of load.

Referring to FIG. 1 a base (1) preferably of a generally triangular shape for ease of mounting wheels (2) or the like so that the base may be steered or moved in a crabbing fashion i.e. the base may be traversed along a straight line in any selected direction with its three wheels in alignment or may be steered in tricycle fashion. A section (3) which may be part of the base or attached thereto has a journalled shaft (4) of preferably large diameter located therein. Mounted on shaft (4) is a rotatable platform (5) having guides therein (not shown) in which wheels, rollers or the like (6) may run for controlled movement of traversable mountings (7) and (8). A fixed mounting, preferably part of platform (5), provides a fixed link (9) for pivotally mounting the fulcrum (21) of fulcrum arm (10) of a pantograph comprising, in addition, links (11) and (12) and proportion arm (13), joined at four pivot points (14), (15), (16) and (17) so that movement of pivot (14) determines, in conjunction with rotation of platform (5), the position of the proportion arm (13) and hence the position of a load carrying platform (18) pivotally located at the free end (19) of the proportion arm (13). Two parallelograms of links formed from fixed link (9), fulcrum arm (10), link (20) common link (22) link (23), pivotally located on the load carrying platform at pivot (24) to form a short link in conjunction with the pivots (16), (19), (21), (24), (25), (26) and (27) of the two parallelograms ensures that the load carrying platform and a load thereon retains its verticality irrespective of the pantograph position. Pivot point (21), the fulcrum, provides a fixed reaction point which ensures desirable structural integrity of arms (10) and (13) with the rotatable platform (5).

A vertical control means, in this example vertical slots milled in traversable mounting (7) for reception of extended ends of pivot (14) provides vertical movement of pivot (14) and pivot (14) is acted upon by a small diameter ram (28) controlled by a gaseous pressure in cylinder (29), located on traversable mounting (7), provided from a relatively large reservoir (30) via suitable piping (31). The pressure on ram (28), being substantially constant, is such that the load on platform (18) is counterbalanced in all positions of the arm. A bar (32) pivoted at a suitable point (33) along its length on traversable mount (8) is pivotally attached at pivot (34) on link (11) of the pantograph and a weight (36) at the opposite end of the bar (32) is of sufficient mass to counterbalance the combined mass of the pantograph and parallelogram links, excluding link (9), and load carrying platform (18) as the combined mass pivots about combinations of pivots (9), (14) and (21). An advantage of this arrangement is that it permits the use of unequal length of proportional arm (13) and fulcrum arm (10) whilst still retaining full counterbalance.

In the case of such as a television camera being the load it is normal practice to mount the camera on a pan and tilt head, or the like, to provide additional control. The added weight of the pan and tilt head may be considered as extra load and be counterbalanced by increasing the pressure in cylinder (29).

Locking devices which may be of any known type such as cylinder brakes or friction clamps, may be applied or released at pivot point (14), as indicated by locking device (40), to lock pivot point (14) in the vertical plane on traversable mounting (7), at wheels or rollers (6), as indicated by locking device (42), to lock traversable mounting (7) in the horizontal plane on rotatable platform (5), and in journalled shaft (4) to lock the rotatable platform (5) in azimuth. The following table shows the effect of locking and unlocking, either singly or in combination, any of the aforementioned locking means.

| Vertical | Horizontal | Azimuth | Effect on load carrying platform |
|---|---|---|---|
| locked | locked | locked | locked in selected position. |
| locked | locked | unlocked | peripheral circular motion on horizontal plane. |
| locked | unlocked | locked | motion in horizontal line. |
| unlocked | locked | locked | motion in vertical line. |
| locked | unlocked | unlocked | motion on horizontal plane. |
| unlocked | unlocked | locked | motion on vertical plane. |
| unlocked | locked | unlocked | motion on a cylindrical plane. |
| unlocked | unlocked | unlocked | complete freedom of motion. |

Manual positional control of the load carrying platform is preferably performed directly at the load carrying platform but remote positional control of the load carrying platform is preferably performed at the control pivot point of the pantograph and may, as the balanced arm is fully balanced, be controlled by three small electric motors, or the like; one for vertical, one for horizontal and one in azimuth; remotely controlled via signal lines. Control by this method has the added advantage that the movement of the load is proportional to the control point displacement provided by the motors.

It will also be obvious to those skilled in the art that various alterations may be made to the apparatus without departing from the invention. For example, the mass counterbalancing of the arm by weights may easily be replaced by a pneumatic or hydraulic system similar to that for counterbalancing the load or it may be counterbalanced by a spring system such as disclosed in British Patent Application No. 8122509.

The following calculations, in conjunction with FIGS. 2 and 3, shows the mathematical proof for balance of the arm and load respectively.

The mass of each element of the structure is represented by M at its centre of gravity.

Balance of mechanism components $M_1$ Mass of links 10, 20 and 22
$M_2$ Mass of link 11
$M_3$ Mass of link 12
$M_4$ Mass of links 13 and 23
$M_5$ Mass of load platform
F Constant vertical force In moving from $\theta_1 = \theta_2 = 0^0$, loss of potential energy of links is:

$$\Delta P.E. = M_1 l_1 (1 - \cos\theta_1) + M_2 \{r_1(1 - \cos\theta_1) + l_2(1 - \cos\theta_2)\} + M_3 \{(r_1 + l_3)(1 - \cos\theta_1) + r_2(1 - \cos\theta_2)\} + M_4 \{L_1 (1 - \cos\theta_1)\} + l_4 (1 - \cos\theta_2)\} M_5 \{L_1 (1 - \cos\theta_1) + L_2 (1 - \cos\theta_2)\}$$

$$\therefore \Delta P.E. = (1 - \cos\theta_1)\{M_1 l_1 + M_2 r_1 + M_3(r_1 + l_3) + (M_4 + M_5)L_1\} + (1 - \cos\theta_2)\{M_2 l_2 + M_3 r_2 + M_4 l_4 + M_5 L_2\}$$

Corresponding work done on force F is:

$$\Delta W_F = F\{r_1(l - \cos\theta_1) = x(l - \cos\theta_2)\}$$

Thus the structure will remain in equilibrium if:

$$Fr_1 + M_1 l_1 + M_2 r_1 + M_3 (r_1 + l_3) + (M_4 + M_5)L_1$$

and $$Fx = M_2 l_2 + M_3 r_2 + M_4 l_4 + M_5 L_2$$

Balance of variable camera load $M_6$ Mass of camera and mounting
P Constant vertical force
Loss of P.E. of $M_6$ is:

$$\Delta P.E. = M_6 \{L_1(l - \cos\theta_1) + L_2(l - \cos\theta_2)\}$$

Work done on force P is:

$$\Delta W_P = P\{r_1(l - \cos\theta_1) + r_2 (l - \cos\theta_2)$$

Thus the load will stay in equilibrium if:

$$Pr_1 = M_6 L_1 \text{ and } Pr_2 = M_6 L_2$$

Since P$\alpha$M$_6$ in both equalities, changes in $M_6$ can be accommodated by changes in P to maintain conditions for equilibrium.

I claim as my invention:

1. A balanced arm for television or the like comprising, a movable base, a rotatable platform mounted on said base, a first traversable mounting on said rotatable platform having vertical control means operable on a control pivot of a pantograph having its fulcrum arm pivotally located on said rotatable table, a load carrying platform pivotally located at the end of the pantograph proportion arm, linkages forming a first parallelogram on said proportion arm wherein one link is formed on said load carrying platform and a second parallelogram on said fulcrum arm wherein one link is formed from part of said rotatable platform and said two parallelograms share a common link; arm mass counterbalancing means pivotally mounted on a second traversable mounting on said rotatable platform and having its fulcrum pivotally attached to a short link of said pantograph, load counterbalancing means operable on said vertical control means, and guide means for said first and second traversable mountings wherein said load carrying platform and load retains verticality and may be traversed with full counterbalance in any plane within its operational limits.

2. A balanced arm as claimed in claim 1 wherein locking means are fitted to said first traversable mounting to lock said vertical control means.

3. A balanced arm as claimed in claim 1 wherein locking means are fitted to said first traversable mounting to lock said first traversable mounting in the horizontal plane.

4. A balanced arm as claimed in claim 1 wherein said load counterbalancing means comprises a small diameter ram controlled by a gaseous pressure from a relatively large reservoir to provide a substantially constant pressure.

5. A balanced arm as claimed in claim 1 wherein said arm mass counterbalancing means comprises a bar pivoted at a distance along its length on said second traversable mounting, pivotally attached to a link of said pantograph at one end and having a weight of sufficient mass at its other end to counterbalance the combined mass of the pantograph, parallelogram links, excluding said link formed on part of said rotatable platform, and said load carrying platform.

6. A balanced arm as claimed in claim 1 wherein said rotatable platform is lockable to said base to prevent movement in azimuth.

7. A balanced arm as claimed in claim 1 wherein the fulcrum of the pantograph is pivoted on the rotatable platform to provide a fixed reaction point to ensure the desirable structural integrity of the fulcrum arm and proportion arm with the rotatable platform.

8. A balanced arm as claimed in claim 1 further comprising locking means fitted to said first transversable mounting for locking said vertical control means and further locking means fitted to said transversable mounting for locking said first transversable mounting in the horizontal plane.

* * * * *